United States Patent
Gole et al.

(10) Patent No.: US 10,642,508 B2
(45) Date of Patent: May 5, 2020

(54) METHOD TO LIMIT IMPACT OF PARTIAL MEDIA FAILURE OF DISK DRIVE AND DETECT/REPORT THE LOSS OF DATA FOR OBJECTS DUE TO PARTIAL FAILURE OF MEDIA

(71) Applicant: TOSHIBA MEMORY CORPORATION, Tokyo (JP)

(72) Inventors: Abhijeet Gole, Cupertino, CA (US); Ratnadeep Joshi, Sunnyvale, CA (US); Philip A. Kufeldt, San Jose, CA (US)

(73) Assignee: TOSHIBA MEMORY CORPORATION, Tokyo (JP)

( * ) Notice: Subject to any disclaimer, the term of this patent is extended or adjusted under 35 U.S.C. 154(b) by 396 days.

(21) Appl. No.: 15/077,639

(22) Filed: Mar. 22, 2016

(65) Prior Publication Data
US 2017/0277451 A1    Sep. 28, 2017

(51) Int. Cl.
*G06F 3/06* (2006.01)
*G06F 11/00* (2006.01)

(52) U.S. Cl.
CPC .......... *G06F 3/0619* (2013.01); *G06F 3/065* (2013.01); *G06F 3/0644* (2013.01); *G06F 3/0676* (2013.01); *G06F 11/004* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,731,680 A | * | 3/1988 | Moriyama | G11B 5/556 318/634 |
| 6,442,117 B1 | * | 8/2002 | Saiki | G11B 7/005 369/47.3 |
| 7,209,981 B1 | * | 4/2007 | Wade | G06F 3/0626 710/300 |
| 7,490,212 B2 | | 2/2009 | Kasiraj et al. | |
| 8,037,345 B1 | | 10/2011 | Iyer et al. | |
| 8,049,980 B1 | * | 11/2011 | Emami | G11B 20/1833 360/31 |
| 8,612,706 B1 | * | 12/2013 | Madril | G06F 3/0619 711/162 |
| 8,819,375 B1 | * | 8/2014 | Pruett | G06F 13/28 707/693 |

(Continued)

OTHER PUBLICATIONS

Data Management and Layout for Shingled Magnetic Recording by Amer (Year: 2011).*

(Continued)

*Primary Examiner* — Paul M Knight
(74) *Attorney, Agent, or Firm* — Kim & Stewart LLP

(57) ABSTRACT

Object data, such as a key-value pair, are stored in a disk drive in conjunction with metadata associated with the object data. A key-value pair and metadata associated therewith are written in different locations in the disk drive, but as part of a single sequential write operation, such as when contents of a key-value buffer containing one or more key-value pairs are flushed to the disk drive. The key-value pair may be written during a first phase of the sequential write operation and the metadata may be written during a second phase of the sequential write operation that does not immediately precede or follow the first phase.

21 Claims, 7 Drawing Sheets

(56) References Cited

U.S. PATENT DOCUMENTS

| | | | | |
|---|---|---|---|---|
| 8,879,183 B1* | 11/2014 | Weikal | ............... | G11B 5/09 |
| | | | | 360/48 |
| 8,954,664 B1* | 2/2015 | Pruett | ............... | G06F 11/1435 |
| | | | | 711/112 |
| 8,959,281 B1* | 2/2015 | Malina | ............... | G06F 12/0246 |
| | | | | 711/103 |
| 2005/0069298 A1 | 3/2005 | Kasiraj et al. | | |
| 2008/0168108 A1 | 7/2008 | Molaro et al. | | |
| 2012/0084261 A1 | 4/2012 | Parab | | |
| 2015/0178161 A1* | 6/2015 | Burd | ............... | G11B 20/1833 |
| | | | | 714/764 |
| 2015/0254144 A1* | 9/2015 | Pantel | ............... | G11B 20/1252 |
| | | | | 360/48 |
| 2016/0064030 A1* | 3/2016 | Pitchumani | ............... | G11B 20/1217 |
| | | | | 360/48 |

OTHER PUBLICATIONS

The Use of Triple-Modular Redundancy to Improve Computer Reliability by Lyons (Year: 1962).*

SMRDB: Key-Value Data Store for Shingled Magnetic Recording Disks by Pitchumani (Year: 2015).*

Reliability Mechanisms for Very Large Storage Systems by Xin (Year: 2003).*

* cited by examiner

METHOD TO LIMIT IMPACT OF PARTIAL MEDIA FAILURE OF DISK DRIVE AND DETECT/REPORT THE LOSS OF DATA FOR OBJECTS DUE TO PARTIAL FAILURE OF MEDIA

BACKGROUND

The use of distributed computing systems, e.g., "cloud computing," has become increasingly common for consumers and enterprises, especially for data storage. This so-called "cloud data storage" employs large numbers of networked storage servers that are organized as a unified repository for data, and are configured as banks or arrays of magnetic hard disk drives (HDDs) and/or solid-state drives (SSDs). Typically, these servers are arranged in high-density configurations to facilitate such large-scale operation. For example, a single cloud data storage system may include thousands or tens of thousands of storage servers installed in stacked or rack-mounted arrays.

The majority of storage in cloud data storage systems is provided by HDDs, due to the low cost-to-capacity associated with such drives. Object-oriented database management systems using "key-value pairs" have a number of advantages over relational database systems, including a flexible data model that has no structure to the data; scalability; simple access application program interfaces (APIs); and enabling clients to define and change the structure of data anytime without impacting the database. A key-value pair is a set of two linked data items: a key, which is a unique identifier for some set of data, and a value, which is the set of data associated with the key. Distributed computing systems using key-value pairs provide a high performance alternative to relational database systems, since an obsolete value is not overwritten when a new version of the value is stored. Instead, newly received key-value pairs can be written in a continuous sequential writing process, thereby eliminating the latency associated with seeking to a different location in an HDD for each newly received key-value pair.

One drawback with storing object-based data on HDDs is that disk errors that render a part of the drive inaccessible or corrupted can render the entire HDD unusable, even though the vast majority of the storage space in the HDD can reliably store data. This is because important metadata associated with each value is included in the associated key that identifies that particular value. Thus, if a corrupted or otherwise unreadable portion of an HDD includes the metadata of one or more values, the identity of the one or more values is lost. In such a scenario, determination of what values may be affected by the corrupted portion of the HDD can be problematic. Furthermore, many storage systems stores have a mapping index of the locations of objects stored on the same HDD as the actual data included in these objects. Thus, if a part of HDD is corrupted, the mapping index can get damaged, and potentially a large portion of data on the HDD can become unreachable.

SUMMARY

One or more embodiments provide systems and methods that may be employed in a cloud data storage system to store object data, such as a key-value pair, in an HDD in conjunction with backup metadata associated with the object data. In some embodiments, a key-value pair and metadata associated therewith are written in different locations in the HDD, but as part of a single sequential write operation. For example, when contents of a key-value buffer containing one or more key-value pairs are flushed to an HDD, a key-value pair and associated metadata may be written to the HDD as a single sequential write operation, where the key-value pair is written during a first phase of the sequential write operation and the metadata are written during a second phase of the sequential write operation that does not immediately precede or follow the first phase.

A method of storing contents of a key-value buffer into one of multiple regions of at least one disk drive in a single sequential write process, according to an embodiment, includes determining that a used capacity of the key-value buffer is greater than a threshold capacity, writing first and second key-value pairs in the key-value buffer to first and second physical locations in one of the regions, respectively, and writing metadata that indicates the first and second physical locations as the storage location for the first and second key-value pairs, respectively, in a third physical location in the region.

A method of retrieving data from a data storage system that repeatedly moves contents of a key-value buffer into one of multiple regions of at least one disk drive in a single sequential write process, according to another embodiment, comprises receiving, from a disk drive of the data storage system, a read-error message in response to a read that targets a first physical location in one of the regions, responsive to the read-error message, issuing a read that targets a second physical location in the region, the second physical location storing metadata that indicates physical locations of key-value pairs that are stored within the first physical location, and determining, based on the metadata, a key associated with the first physical location.

DETAILED DESCRIPTION

Figure 1:
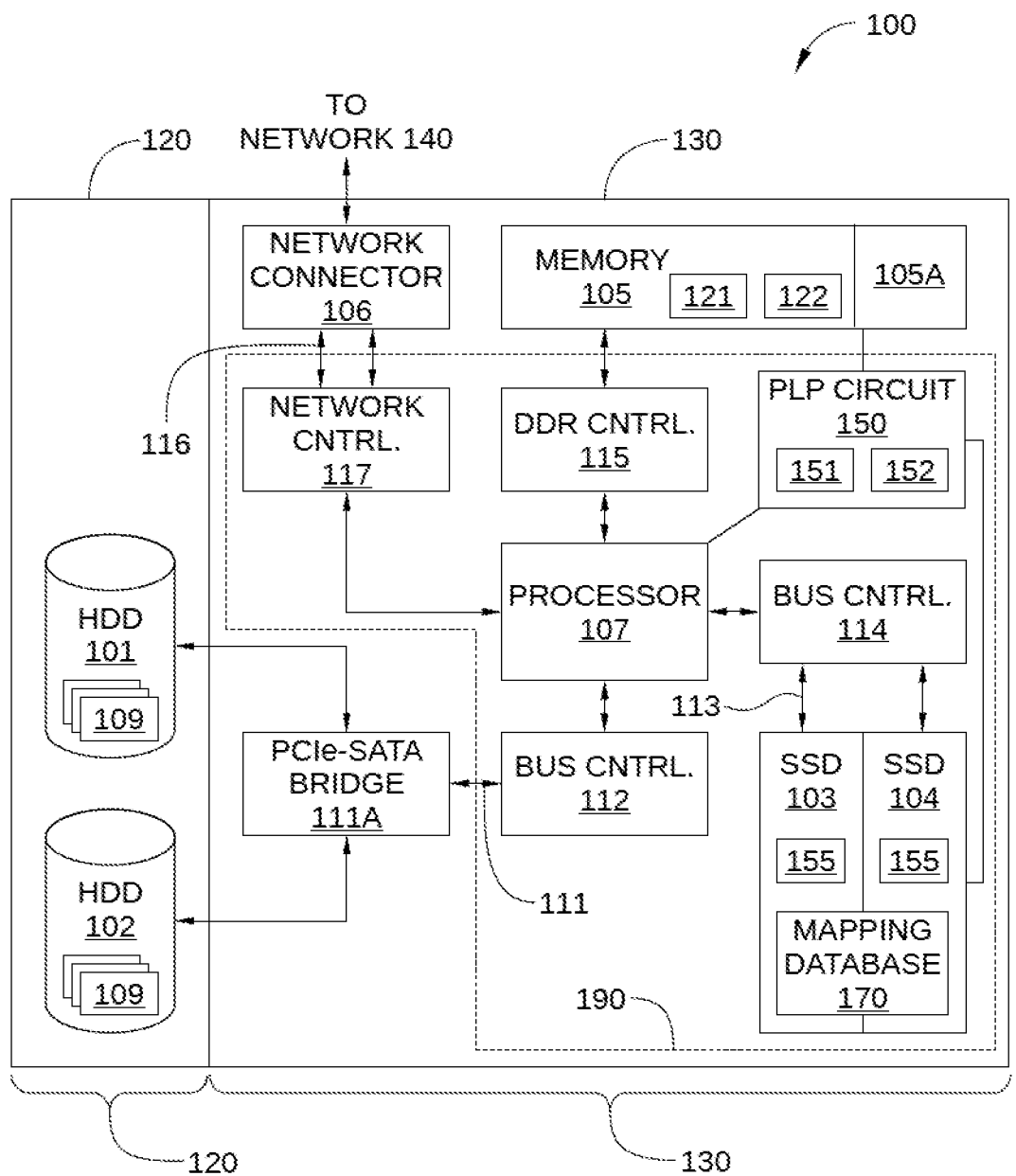
FIG. 1 is a block diagram of a data storage system, configured according to one or more embodiments.

FIG. 1 is a block diagram of a data storage system 100, configured according to one or more embodiments. Data storage system 100 may be configured to provide data storage capacity as one of a plurality of object servers of a cloud storage system (not shown), and is connected directly to a network 140. Network 140 may be any technically feasible type of communications network that allows data to be exchanged between clients and data storage system 100.

For example, network 140 may include a wide area network (WAN), a local area network (LAN), a wireless (WiFi) network, and/or the Internet, among others.

In some embodiments, data storage system 100 may be an object-based storage system, which manipulates data in flexible-sized data units of storage called "objects." These objects generally include a set of data, also referred to as a "value," and an identifier, sometimes referred to as a "key", which together form a "key-value pair." In addition to the key and value, such objects may include other attributes or meta-data, for example a version number and data integrity checks of the value portion of the object. The key or other identifier facilitates storage, retrieval, and other manipulation of the associated value by data storage system 100, independent of the specific physical storage location or locations of the object in distributed storage system 100 (such as a specific location in a particular storage device). This approach simplifies and streamlines data storage in cloud computing, since a client can make data storage requests directly to a particular data storage system 100 without consulting a large data structure describing the entire addressable space of distributed storage system 100.

In the embodiment illustrated in FIG. 1, data storage system 100 includes two hard disk drives (HDDs) 101 and 102, one or more solid-state drives (SSDs) 103 and 104, a memory 105, a network connector 106, and a power loss protection (PLP) circuit 150, all connected to a processor 107 as shown. Data storage system 100 also includes a support frame 120, on which HDD 101 and HDD 102 are mounted, and a printed circuit board (PCB) 130, on which SSDs 103 and 104, memory 105, network connector 106, and processor 107 are mounted. In alternative embodiments, SSDs 103 and 104, memory 105, network connector 106, processor 107, and PLP circuit 150 may be mounted on two or more separate PCBs, rather than the single PCB 130.

HDDs 101 and 102 are magnetic disk drives that provide storage capacity for cloud storage system 100, storing data (objects 109) when requested by external clients via network 140, where each object may include one or more key-value pairs. In the embodiments illustrated herein, HDDs 101 and 102 are shingled magnetic recording (SMR) drives, the operation of which is described in further detail below in conjunction with FIG. 2. In other embodiments, HDDs 101 and 102 may be conventional HDDs with non-overlapping tracks. HDDs 101 and 102 store objects 109 in physical locations of the magnetic media contained in HDD 101 and 102, i.e., in sectors of HDD 101 and/or 102. HDDs 101 and 102 are connected to processor 107 via a bus 111, such as a PCIe bus, and a bus controller 112, such as a PCIe controller. HDDs 101 and 102 may each be a 2.5-inch form-factor HDD that is configured to conform to the 2.5-inch form-factor specification for HDDs (i.e., the so-called SFF-8201 specification). In some embodiments, HDDs 101 and 102 are arranged on support frame 120 so that they conform to the 3.5-inch form-factor specification for HDDs (i.e., the so-called SFF-8301 specification).

SSD 103 and 104 are each connected to processor 107 via a bus 113, such as a SATA bus, and a bus controller 114, such as a SATA controller. SSDs 103 and 104 are configured to store a mapping table 170 that associates each object 109 to a unique physical location in either HDD 101 or HDD 102 that is part of the addressable space of data storage system 100. Thus, whenever a new object 109 is stored in HDD 101 and/or HDD 102, mapping table 170 is updated, for example by host software 121. Mapping table 170 may be partially stored in SSD 103 and partially stored in SSD 104, as shown in FIG. 1. Alternatively, mapping table 170 may be stored entirely in SSD 103 or entirely in SSD 104. Because mapping table 170 is not stored on HDD 101 or HDD 102, mapping table 170 can be updated more quickly and without causing HDD 101 or HDD 102 to interrupt the writing of object data to perform the updating of mapping table 170.

Because the combined storage capacity of HDD 101 and HDD 102 can be 6 TB or more, mapping table 170 may occupy a relatively large portion of SSD 103 and/or SSD 104, and SSDs 103 and 104 are sized accordingly. For example, in an embodiment of data storage system 100 configured for 4 KB objects (i.e., 250 objects per MB), assuming that 8 bytes are needed to map each object plus an additional 16 bytes for a UUID, mapping table 170 can have a size of 78 GB or more. In such an embodiment, SSDs 103 and 104 may each be a 240 GB M.2 form-factor SSD, which can be readily accommodated by PCB 130.

In some embodiments, SSDs 103 and 104 are also configured to include one or more reserved regions 155 for storing data copied from a nonvolatile buffer 123 (shown in FIG. 2) in memory 105 in the event of unexpected power loss. More specifically, when power loss is detected, reserved regions 155 may be configured to store key-value pairs recently received by data storage system 100 from external clients and stored in nonvolatile buffer 123, thereby effectively making a portion of volatile memory 105 a nonvolatile buffer. The operation of such a nonvolatile buffer and of PLP circuit 150, in response to unexpected power loss, is described below.

Memory 105 includes one or more solid-state memory devices or chips, such as an array of volatile dynamic random-access memory (DRAM) chips. For example, in some embodiments, memory 105 includes four or more double data rate (DDR) memory chips. In such embodiments, memory 105 is connected to processor 107 via a DDR controller 115. In some embodiments, memory 105 may include a nonvolatile RAM section 105A, or be comprised entirely of non-volatile RAM. Although typically formed with volatile RAM, such as dynamic RAM, non-volatile RAM section 105A can be considered nonvolatile because memory 105, processor 107, and SSD 103 and/or 104 are all coupled to PLP circuit 150. Consequently, upon detection of power loss to data storage system 100, data stored in nonvolatile RAM section 105A can be stored in one or more reserved regions 155 in SSDs 103 and/or 104, and is not lost despite the loss of power to data storage system 100.

During operation, host software 121 and object service software 122 may reside in memory 105, and nonvolatile buffer 123 may reside in nonvolatile RAM section 105A. Host software 121 is configured to perform management tasks associated with cloud storage system 100 and thereby provide the functionality of a host or object server that receives GET, PUT, and DELETE commands from clients via network 140. Object service software 122 is configured to enable efficient storage of object data, received from clients external to data storage system 100, in HDDs 101 and 102. Nonvolatile buffer 123 is configured to store key-value pairs received from a client or clients external to data storage system 100, in particular the most recently received key-value pairs.

Network connector 106 enables one or more network cables to be connected to data storage system 100 and thereby connected to network 140. For example, network connector 106 may be a modified SFF-8482 connector. As shown, network connector 106 is connected to processor 107 via a bus 116, for example one or more serial gigabit media independent interfaces (SGMII), and a network controller 117, such as an Ethernet controller, which controls network communications from and to data storage system 100.

Processor 107 may be any suitable processor implemented as a single core or multi-core central processing unit (CPU), a graphics processing unit (GPU), an application-specific integrated circuit (ASIC), a field programmable gate array (FPGA), or another type of processing unit. Processor 107 is configured to execute program instructions associated with the operation of data storage system 100 as an object server of cloud storage system 100, including receiving data from and transmitting data to clients external to cloud storage system 100, buffering received key-value pairs in nonvolatile buffer 123, and recording a mapping of each received key to a physical location in HDD 101 or 102 in mapping table 170. In some embodiments, processor 107 and one or more other elements of data storage system 100 may be formed as a single chip, such as a system-on-chip (SOC) 190. In the embodiment illustrated in FIG. 1, SOC 190 includes bus controller 112, bus controller 114, DDR controller 115, and network controller 117. Furthermore, in some embodiments, processor 107 may be shared for use by other functions of data storage system 100, such as managing the mechanical functions of HDDs 101 and 102 and/or the data storage functions of SSDs 103 and 104.

PLP circuit 150 is configured to power memory 105 or nonvolatile RAM section 105A, processor 107, and SSDs 103 and 104 for a short but known time interval, thereby allowing data stored in memory 105 to be copied to the one or more reserved regions 155 of SSDs 103 and/or 104 in the event of unexpected power loss. Advantageously, a portion of memory 105 can be employed as a smaller, but much faster mass storage device than SSDs 103 or 104, since DRAM write operations are typically performed orders of magnitude faster than NAND write operations. Thus, processor 107 may cause data received by data storage system 100 from an external client to be initially stored in memory 105 rather than in SSDs 103 or 104; PLP circuit 150 allows some or all of memory 105 to temporarily function as non-volatile memory, and data stored therein will not be lost in the event of unexpected power loss to data storage system 100. As shown, PLP circuit 150 includes a management integrated circuit (IC) 151 and a temporary power source 152.

Management IC 151 is configured to monitor an external power source (not shown) and temporary power source 152, and to alert processor 107 of the status of each. Management IC 151 is configured to detect interruption of power from the external power source, to alert processor 107 of the interruption of power, and to switch temporary power source 152 from an "accept power" mode to a "provide power" mode. Thus, when an interruption of power from the external power source is detected, data storage system 100 can continue to operate for a finite time, for example a few seconds or minutes, depending on the charge capacity of temporary power source 152. During such a time, processor 107 can copy data stored in memory 105 to reserved regions 155 of SSD 103 or 104. Furthermore, upon power restoration from the external power source, PLP circuit 150 is configured to copy data stored in reserved regions 155 back to memory 105.

Management IC 151 also monitors the status of temporary power source 152, notifying processor 107 when temporary power source 152 has sufficient charge to power processor 107, memory 105, and SSDs 103 and 104 for a minimum target time. Generally, the minimum target time is a time period that is at least as long as a time required for processor 107 to copy data stored in memory 105 to reserved region 155. For example, in an embodiment in which the storage capacity of memory 105 is approximately 1 gigabyte (GB) and the data rate of SSD 103 and 104 is approximately 650 megabytes (MBs) per second, the minimum target time may be up to about two seconds. Thus, when management IC 151 determines that temporary power source 152 has insufficient charge to provide power to processor 107, memory 105, and SSDs 103 and 104 for two seconds, management IC 151 notifies processor 107. In some embodiments, when temporary power source 152 has insufficient charge to power processor 107, memory 105, and SSDs 103 and 104 for the minimum target time, processor 107 does not make memory 105 available for temporarily storing write data.

Temporary power source 152 may be any technically feasible device capable of providing electrical power to processor 107, memory 105, and SSDs 103 and 104 for a finite period of time, as described above. Suitable devices includes rechargeable batteries, dielectric capacitors, and electrochemical capacitors (also referred to as "supercapacitors"). The size, configuration, and power storage capacity of temporary power source 152 depends on a plurality of factors, including power use of SSDs 103 and 104, the data storage capacity of memory 105, the data rate of SSDs 103 and 104, and space available for temporary power source 152. One of skill in the art, upon reading this disclosure herein, can readily determine a suitable size, configuration, and power storage capacity of temporary power source 152 for a particular embodiment of data storage system 100.

Figure 2:
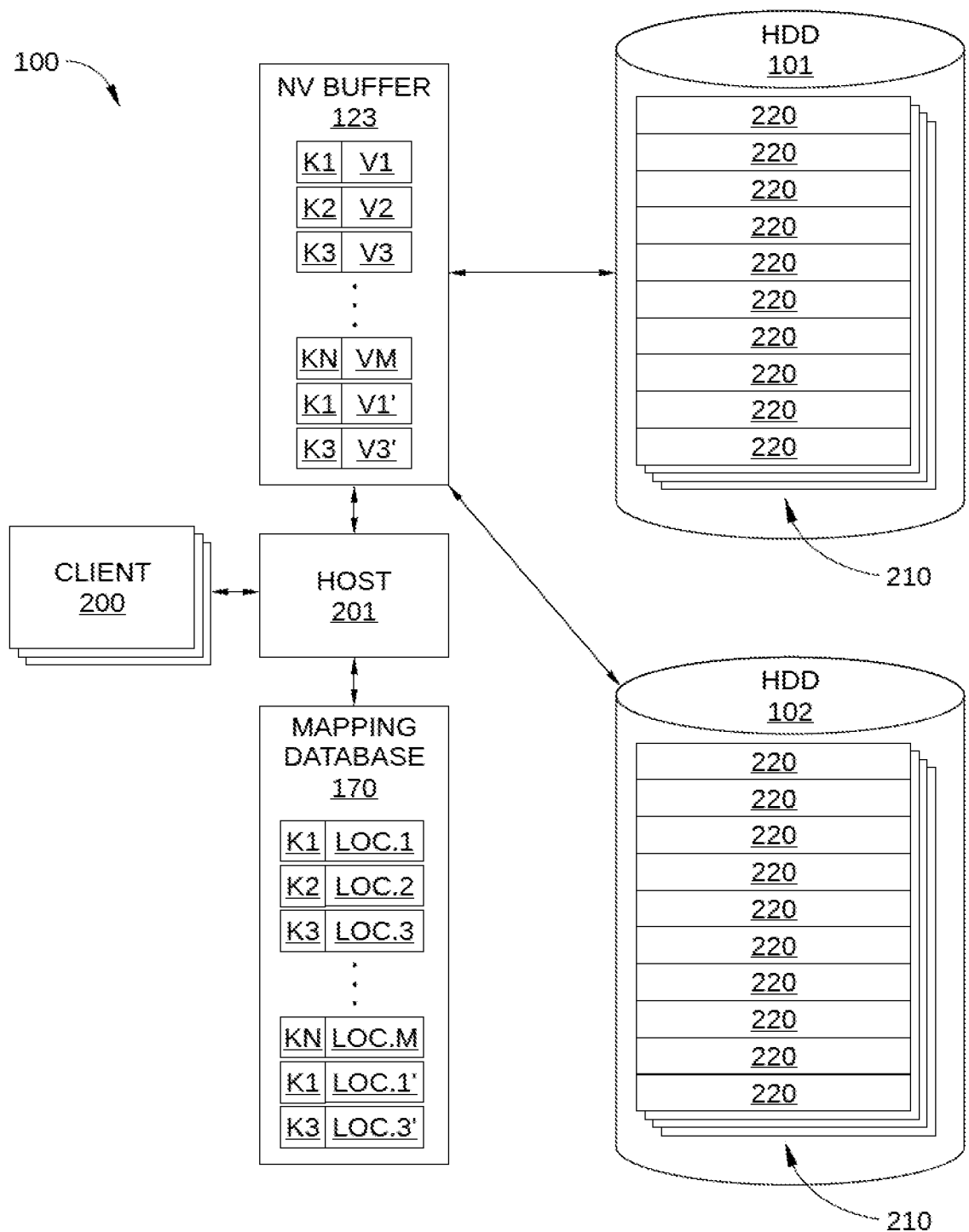
FIG. 2 is a block diagram illustrating the storage of object data received by the data storage system of FIG. 1 from one or more external clients, according to one or more embodiments.

FIG. 2 is a block diagram illustrating the storage of object data received by data storage system 100 from one or more external clients 200, according to one or more embodiments. As shown, nonvolatile buffer 123 is configured to store a plurality of key-value pairs K1-V1, K2-V2, . . . KN-VM received from one or more external clients 200 by a host 201 associated with data storage device 100. For example, each of clients 200 may be a web-based application or any other technically feasible storage client, and host 201 may be host software 121 and/or object service software 122 running on processor 107 in FIG. 1. Mapping table 170 is configured to store a mapping of keys K1-KN to respective locations 1-N. For ease of description, keys K1-KN are depicted as listed in mapping table 170 in the order received by data storage system 100.

HDDs 101 and 102 are each configured to include a plurality of sequential write regions 210. Each of sequential write regions 210 is a contiguous area of HDD 101 or HDD 102, such as a group of adjacent data tracks, and includes multiple slabs 220 for storing data. In some embodiments, each sequential write region 210 corresponds in size and configuration to a shingled magnetic recording (SMR) "band" or "zone." Thus, in such embodiments, each sequential write region 210 includes a plurality of slightly overlapping data tracks, and is separated from adjacent sequential write regions 210 by a guard space. By contrast, slabs 220 are generally not separated by a guard space, so that the final sector of one slab 220 is adjacent to the first sector of the immediately following slab 220. Sequential write regions 210 may be on the order of 256 MB or larger. In some embodiments, each slab 220 is sized to store the same quantity of data as nonvolatile buffer 123, so that each slab 220 can store the entire contents of nonvolatile buffer 123 when flushed. For example, in some embodiments, nonvolatile buffer 123 and each slab 220 may be sized to store 16 MB of data. In other embodiments, the size of nonvolatile buffer 123 and each slab 220 may be any other technically feasible size, for example 8 MB, 32 MB, etc.

Locations 1-M are physical locations in HDD 101 or HDD 102 that are assigned for storing key-value pairs. In general, each of locations 1-M is selected to include the next available sectors in HDD 101 or HDD 102 for storing object data. In the embodiment illustrated in FIG. 2, key K1 of key-value pair K1-V1 is mapped to location 1 in mapping table 170, and location 1 is therefore assigned to store the data associated with value V1 of key-value pair K1-V1. Similarly, key K2 of key-value pair K2-V2 is mapped to location 2, which is assigned to store the data associated with value V2 of key-value pair K2-V2, key K3 of key-value pair K3-V3 is mapped to location 3, which is assigned to store the data associated with value V3 of key-value pair K3-V3, and so on. Because key K2 is the first key received after key K1, location 2 includes the physical area of HDD 101 or HDD 102 immediately following the physical area of location 1. In the same vein, because key K3 is the first key received after key K2, location 3 includes the physical area immediately following the physical area of location 2. Thus, when the contents of nonvolatile buffer 123 are flushed to locations 1-N in HDD 101 or HDD 102, said contents can be written in a single sequential write operation.

It is well-known in the art that a quantity of data can be stored by a magnetic storage device at a significantly higher rate in a single sequential write that as a large number of randomly located writes. Therefore, by buffering received key-value pairs in nonvolatile buffer 123, and writing the contents of nonvolatile buffer 123 to HDD 101 or 102 in a single sequential write operation, data storage system 100 can efficiently store object data received from clients 200, freeing HDD 101 and 102 to perform other tasks as data are buffered in nonvolatile buffer 123. For example, HDD 101 or HDD 102 can perform a compaction process on one or more sequential write regions 210 as data are buffered in nonvolatile buffer 123.

The number M of locations mapped by data storage device 100 in mapping table 170 is a function of the total data storage capacity of HDDs 101 and 102 and the minimum size of key-value pairs accepted by data storage device 100. Given that the data storage capacity of HDDs 101 and 102 may be on the order of several terabytes, M may have a value on the order of 10s or 100s of millions. Locations 1-M may be indicated in any suitable fashion in mapping table 170, for example by an offset and number of sectors suitable for storing the data mapped to that location.

When assigned for storing a specific key-value pair, each of locations 1-M is disposed within a sequential write region 210 that is either empty or active, and is not disposed within a sequential write region 210 that is either occupied or compacting. A sequential write region 210 is in an empty state when no key-value pairs are stored therein, and is therefore available for storing key-value pairs. A sequential write region 210 is in an active state when key-value pairs are stored therein, but there is still available storage capacity for storing additional key-value pairs, for example, when one or more slabs in that particular sequential write region 210 are empty and available for storing key-value pairs flushed from nonvolatile buffer 123. A sequential write region 210 is in an occupied state when key-value pairs are stored therein and there is no available storage capacity for storing additional key-value pairs, for example, when all slabs 220 in that particular sequential write region 210 store key-value pairs that have been flushed from nonvolatile buffer 123. In some embodiments, only a single sequential write region 210 may be in an active state in each of HDDs 101 and 102. In other embodiments, multiple sequential write regions 210 may be in an active state in a particular HDD.

Figure 3:
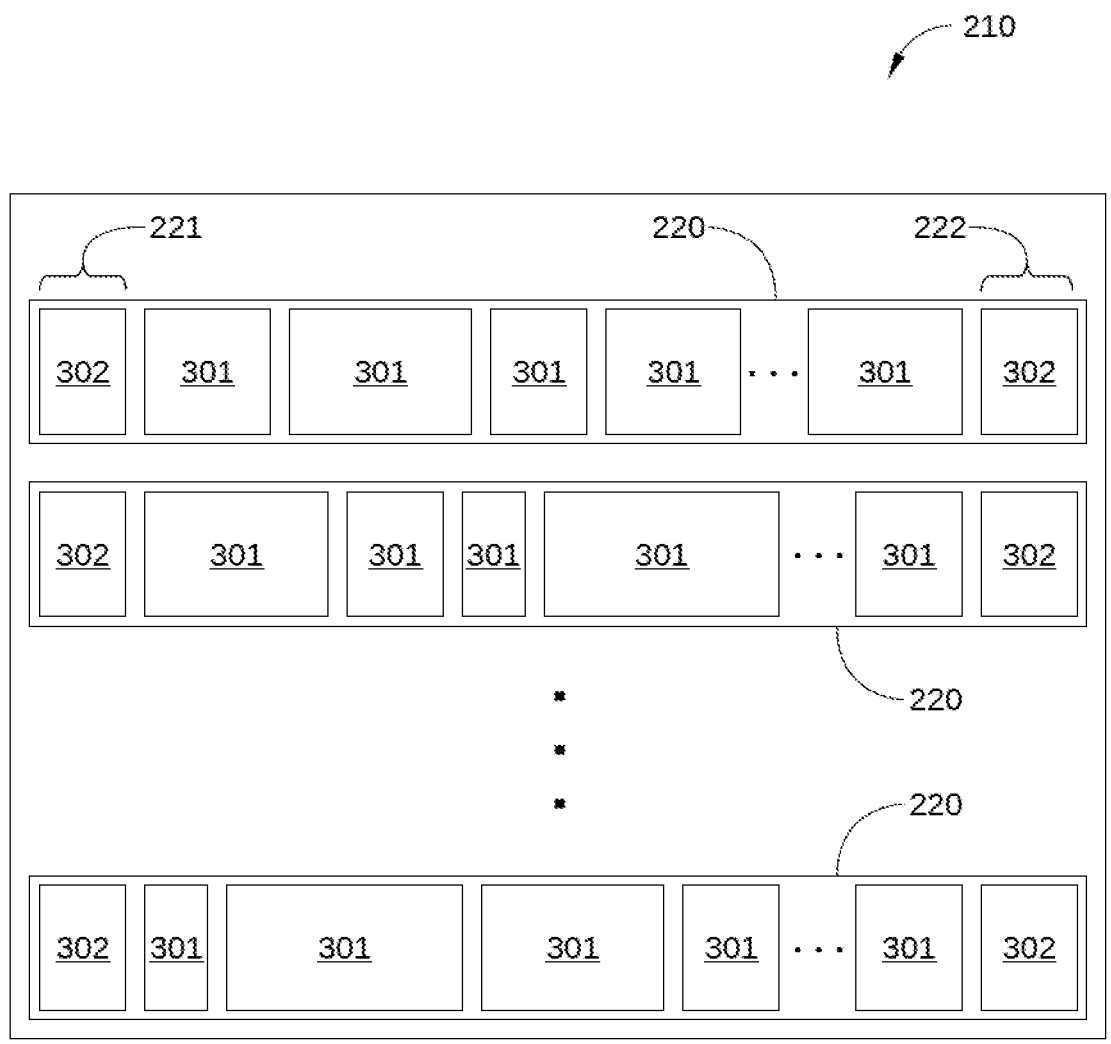
FIG. 3 is a schematic diagram of one of the sequential write regions of FIG. 2, according to one or more embodiments.

FIG. 3 is a schematic diagram of one of the sequential write regions 210 of FIG. 2, according to one or more embodiments. As noted above, in some embodiments, each slab 220 is sized to contain the entire contents of nonvolatile buffer 123. Thus, in such embodiments, each slab 220 typically receives the entire contents of nonvolatile buffer 123 via a single sequential write operation. In such embodiments, the entire contents of nonvolatile buffer 123 written to a particular slab 220 include one or more key-value pairs 301 and backup metadata 302 associated with each of the key-value pairs 301 stored in that particular slab 220. Also included in region 210, but omitted from FIG. 3 for clarity, are one or more label regions that contain region-specific metadata.

As shown, key-value pairs 301 are generally of varying size. In addition, according to some embodiments, backup metadata 302 are generally stored in physical locations (i.e., sectors) of HDD 101 or HDD 102 that are included in slab 220, but are not proximate the key-value pairs 301 associated therewith. In this way, the likelihood of a single media scratch or region of corrupted data encompassing both a key-value pair 301 and the associated backup metadata 302 is substantially reduced. For example, in some embodiments, backup metadata 302 for each key-value pair 301 stored in region 210 may be stored in a beginning portion 221 of slab 220, an ending portion 222 of slab 220, and/or in both. One such embodiment is illustrated in FIG. 4.

Figure 4:
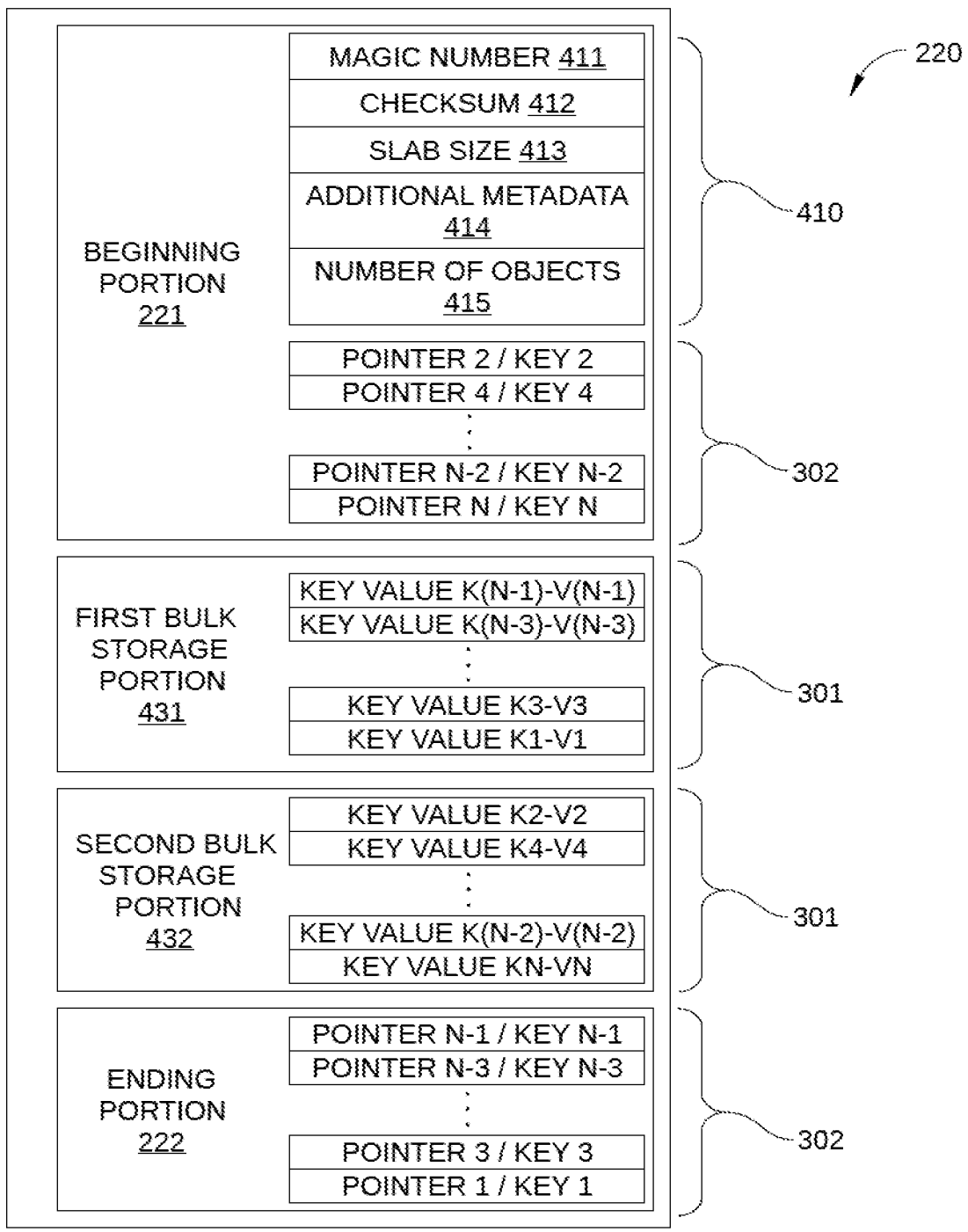
FIG. 4 is a schematic diagram of one of the slabs included in a write region of FIG. 2, according to one or more embodiments.

FIG. 4 is a schematic diagram of one of the slabs 220 included in write region 210, according to one or more embodiments. In the embodiment illustrated in FIG. 4, slab 220 stores N key-value pairs K1-V1, K2-V2, . . . KN-VN, where key-value pair K1-V1 includes a value V1 and a unique key K1, key-value pair K2-V2 includes a value V2 and a unique key K2, and so on. As described above in conjunction with FIG. 2, some of the key-value pairs stored in slab 220 may include one or more duplicate key-value pairs, where the most recently received duplicate key-value pair includes a duplicate key and an updated value to be associated with that particular key. For simplicity, such duplicate key-value pairs are not depicted in FIG. 4. In addition, slab 220 also includes slab metadata 410 and backup metadata 302.

According to one or more embodiments, key-value pairs K1-V1, K2-V2, . . . KN-VN are stored in physical locations or sectors in slab 220 that are distinct from the physical locations in which backup metadata 302 for these key-value pairs are stored. For example, in the embodiment illustrated in FIG. 4, odd-numbered key-value pairs (K1-V1, K3-V3, and so on) are stored in a first bulk storage portion 431 of slab 220, and even-numbered key-value pairs (K2-V2, K4-V4, and so on) are stored in a second bulk storage portion 432 of slab 220. By contrast, backup metadata 302 associated with key-value pairs K1-V1, K2-V2, . . . KN-VN are not stored in first bulk storage portion 431 or second bulk storage portion 432, and are instead stored in beginning portion 221 of slab 220, ending portion 222 of slab 220, and/or in both.

In some embodiments, the numbering of the key-value pairs depicted in FIG. 4 may represent, for example, an order in which the key-value pairs were received by data storage system 100 from a client. By contrast, metadata and key-value pairs are depicted in slab 220 in FIG. 4 in the order written to slab 220. Thus, the position of beginning portion 221, a first bulk storage portion 431, a second bulk storage portion 432, and ending portion 222 indicates, from top to bottom, the order in which data are written to slab 220 when data are copied from nonvolatile buffer 123.

In some embodiments, all or substantially all of backup metadata 302 are stored in beginning portion 221, which is separated from all of the key-value pairs stored in slab 220 except for one. Specifically, in the embodiment illustrated in FIG. 4, beginning portion 221 is only adjacent to key-value pair K(N−1)-V(N−1). In other embodiments, all or substantially all of backup metadata 302 are stored in ending portion 222, which is separated from all of the key-value pairs stored in slab 220 except for one. Specifically, in the embodiment illustrated in FIG. 4, ending portion 222 is only adjacent to key-value pair KN-VN. In still other embodiments, a portion of backup metadata 302 are stored in beginning portion 221, for example backup metadata associated with even-numbered key-value pairs, and a remaining portion of backup metadata 302 are stored in ending portion 222, for example backup metadata associated with odd-numbered key-value pairs. In yet other embodiments, some or all of backup metadata 302 may be stored in any other portion of slab 220 that is distinct from, and physically separated from, the key-value pairs stored in slab 220.

Slab metadata 410 is generally stored in beginning portion 221 of slab 220, where beginning portion 221 includes the initial sectors of slab 220, i.e., the first sectors to which data are stored when slab 220 is filled with data from nonvolatile buffer 123. Slab metadata 410 includes slab-specific metadata that facilitate the selective retrieval of key-value pairs stored in slab 220. For example, in some embodiments, slab metadata 410 may include a so-called "magic number" 411, a checksum 412, a slab size 413, additional metadata 414, and, in some embodiments, a number of objects 415 stored in slab 220.

Magic number 411 may be any identifier, generally at the beginning of slab metadata 410, that confirms slab 220 is a particular data structure, i.e., a data slab of region 210, and indicates the beginning of the data structure of slab 220. Checksum 412 includes data for error detection in slab 220, slab size 413 indicates the size of slab 220 for embodiments in which slab size may vary in different sequential write regions 210, and additional metadata 414 may include any other metadata associated with slab 220 for facilitating operation of data storage system 100. Number of objects 415 may include the total number of objects, i.e., key-value pairs, that are stored in slab 220. Alternatively or additionally, number of objects 415 may include a number of objects stored in first bulk storage portion 431 of slab 220 and a number of objects stored in second bulk storage portion 432 of slab 220.

Backup metadata 302 includes metadata that identifies specific key-values stored in slab 220 and information indicating the physical location or locations in which the specific key-values are stored in slab 220. For instance, in some embodiments, backup metadata 302 includes, for a particular key-value stored in slab 220, the key of the key value and a pointer that indicates the sectors of slab 220 that store the particular key-value pair. For example, for key-value pair K1-V1, backup metadata includes key K1 and a pointer P1, for key-value pair K2-V2, backup metadata includes key K2 and a pointer P2, and so on. In some embodiments, the pointer includes an offset and an object size. In some embodiments, backup metadata 302 may include a mapping of each pointer to each key stored in slab 220. Thus, given a particular physical location in slab 220, the key of each key-value pair that is stored at least in part in the particular physical location can be identified. Consequently, when a portion of slab 220 is determined to be corrupted, partially overwritten by an adjacent track, or otherwise unreadable, objects that are at least partially stored in the corrupted portion can be readily identified. One such embodiment is illustrated in FIG. 5.

Figure 5:
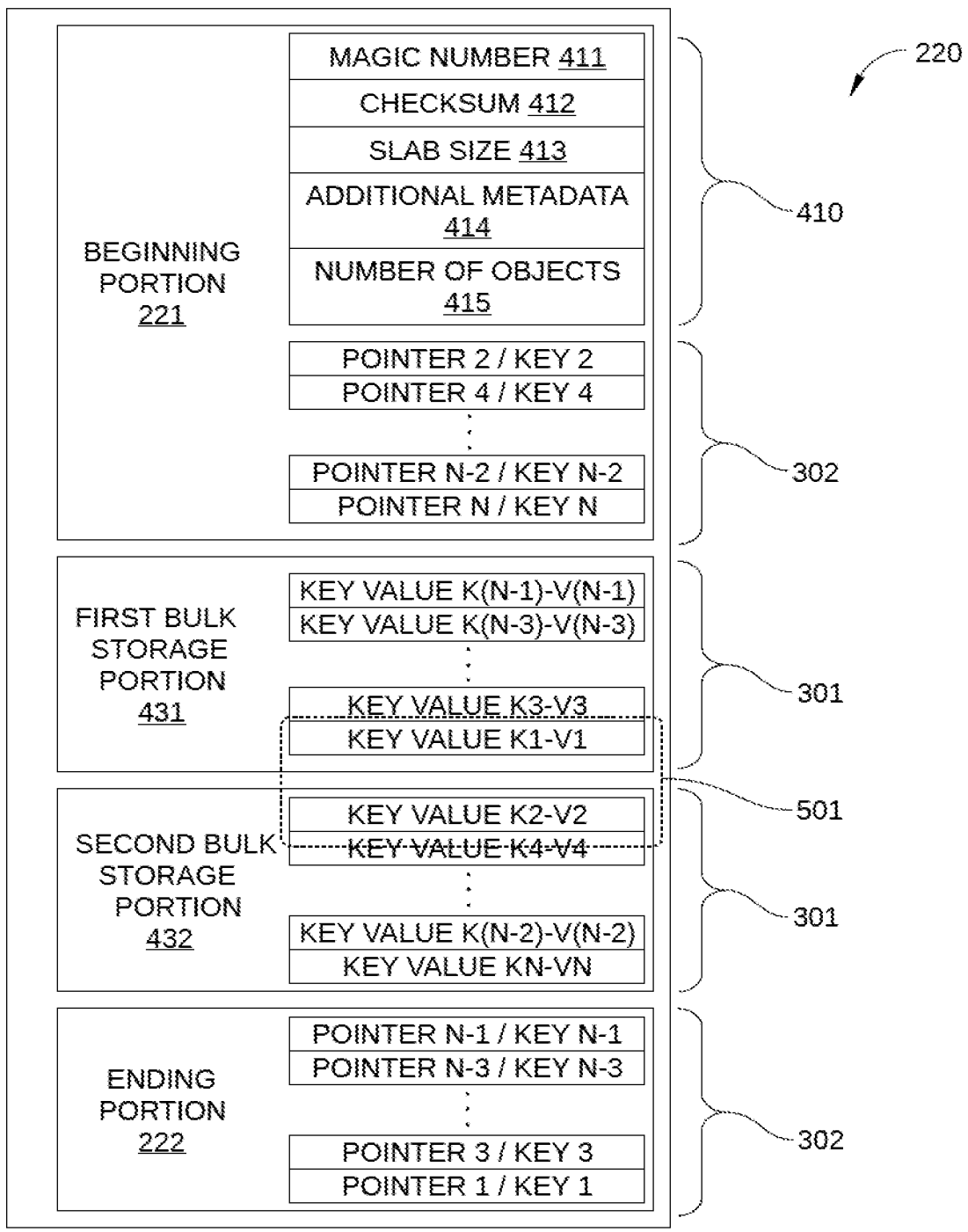
FIG. 5 is a schematic diagram of the slab of FIG. 4 that has an unreadable region, according to one or more embodiments.

FIG. 5 is a schematic diagram of one of the slabs 220 included in write region 210 that has an unreadable region 501, according to one or more embodiments. For ease of description, slab 220 is assumed to be located in HDD 101. As shown, unreadable region 501 extends across physical locations of slab 220 that store data associated with key-value pairs K1-V1, K2-V2, and K4-V4. Specifically, all of the physical locations storing key-value pairs K1-V1 and K2-V2 are included in unreadable region 501, while a portion of the locations storing key-value pair K4-V4 are included in unreadable region 501. Unreadable region 501 may include a media scratch or other media defect, one or more data tracks that have been partially overwritten by adjacent data tracks, or any other sectors of slab 220 determined to be unreadable.

In some embodiments, metadata 302 is stored in two separate portions of slab 220, to reduce or eliminate the possibility that unreadable region 501 includes both a key-value pair and backup metadata 302 associated with that particular key-value pair. In such embodiments, backup metadata 302 associated with key-value pairs included in unreadable region 501 is unlikely to also be included in unreadable region 501, therefore the key-value pairs included in unreadable region 501 can be readily identified, according to embodiments described below.

For example, in the embodiment illustrated in FIGS. 4 and 5, beginning portion 221 stores backup metadata 302 that are associated with key-value pairs stored in second bulk storage portion 432, i.e., the pointers and keys for the even-numbered key-values pairs. By contrast, the even-numbered key-value pairs are stored in a physical location separated from beginning portion 221, i.e., in second bulk storage portion 432 of slab 220. Thus, because second bulk storage portion 432 and beginning portion 221 are separated by first bulk storage portion 431 of slab 220, unreadable region 501 must span approximately half of slab 220 to include both even-numbered key-values pairs and pointers and keys for even-numbered key-values pairs. Similarly, ending portion 222 stores backup metadata 302 that are associated with key-value pairs stored in first bulk storage portion 431, i.e., the pointers and keys for the odd-numbered key-values pairs. By contrast, the odd-numbered key-value pairs are stored in first bulk storage portion 431 of slab 220. Thus, first bulk storage portion 431 and ending portion 222 are separated by second portion 431 of slab 220.

In operation, when data storage system 100 receives a GET command from client 200 for a value associated with key K1, K2, or K4, data storage system 100 issues a read command to HDD 101 for the physical locations indicated in mapping database 170 (shown in FIGS. 1 and 2) that correspond to that key. Since the data for each of these keys is stored in physical locations that are at least partially unreadable, HDD 101 returns a read error message to data storage system 100. Data storage system 100 can then inform client 200 that the copy of the requested key-value pair stored in data storage system 100 is unreadable, and client 200 can recover accordingly, for example by retrieving a copy of the requested key-value pair from a different data storage system. Alternatively or additionally, in some embodiments, read errors may be encountered and reported as part of a compaction process in HDD 101 or HDD 102, in which a region is read, and the validity of each object in that region is checked. When valid, i.e., not deleted or overwritten, an object is stored in non-volatile buffer 123, and is eventually written to a slab 220 in a different sequential write region 210.

Read errors may be encountered for one or more multiple objects during such a compaction process, and backup metadata can be used to determine which keys that have been corrupted and reported to a client accordingly.

The above-described pro-active notification may provide a client with a list of keys that have been lost because of data errors. Thus, the client can take corrective action (i.e., replication/resynchronization) immediately. Usually the client is a cluster application that maintains multiple replicas for each object. Therefore, if a particular object is lost in one instance of data storage system 100, the client can replicate that object from other instances of data storage system 100 and maintain the replication count.

Furthermore, in traditional systems, a client can encounter such errors only while reading, thus, data can be corrupted without the client being notified. Thus, read errors can build up and, when a whole HDD fails, the client must rebalance the replication count of all of the data lost, thereby resulting in terabytes of data flow on the network, which causes the application I/O path to suffer.

By contrast, the above-described pro-active notification of data storage system 100 enables such rebalancing to be performed in a phased manner, since data storage drive 100 can immediately inform a client about lost keys detected because of adjacent errors during read or during a compaction process.

It is noted that corrupted or otherwise unreadable regions in slab 220 are not necessarily restricted to a single key-value pair. Thus, when the presence of unreadable region 501 is detected via a GET command, as described above, one or more additional key-values are likely also affected. In general, identification of any such additional unreadable key-values stored in slab 220 can be advantageous for the operation of client 200. However, determination of these additional key-values, if any, can be problematic.

Specifically, the metadata that identifies a particular key-value pair, for example the key, is typically included in the key-value when stored in slab 220. Therefore, if the key-value is included in unreadable region 501, such metadata are rendered unreadable, and the identity of the value that has been lost is also usually unreadable. Consequently, once unreadable region 501 is detected, to determine what other values may be affected by unreadable region 501, an exhaustive search of mapping database 170 may be required. For example, for each key stored in mapping database 170, the corresponding location is checked for at least partial inclusion in unreadable region 501. Thus, every entry of mapping database 170 must be checked. Alternatively, a more time-efficient search can be made if a reverse mapping of the information in mapping database 170 is available that organizes all entries in mapping database 170 by location. However, such an alternative effectively doubles the size of flash memory required by data storage system 100. According to some embodiments, backup metadata 302 are employed to efficiently determine what other key-value pairs may be affected by unreadable region 501 in slab 220 without the above-described drawbacks. One such embodiment is described in conjunction with FIG. 6.

Figure 6:
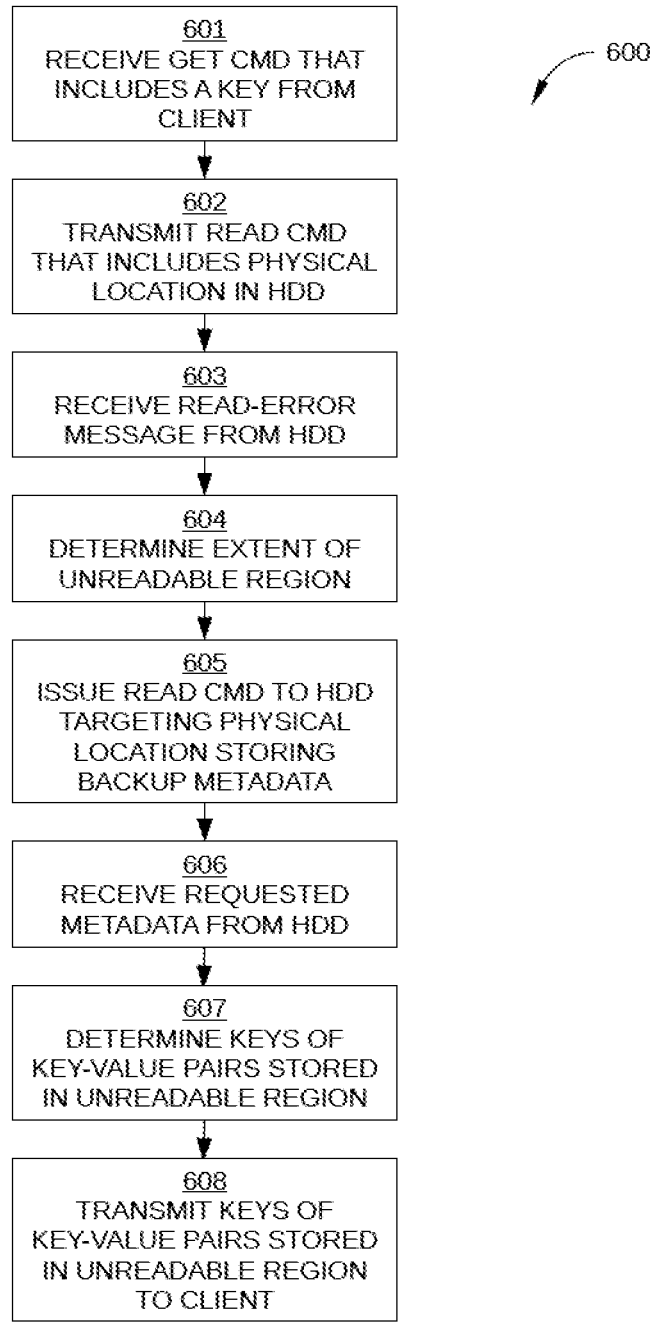
FIG. 6 sets forth a flowchart of method steps carried out by a data storage system when retrieving data from a portion of a disk drive that includes unreadable data, according to one or more embodiments.

FIG. 6 sets forth a flowchart of method steps carried out by data storage system 100 when retrieving data from a portion of HDD 101 or 102 that includes unreadable data, according to one or more embodiments. Although the method steps are described in conjunction with data storage system 100 of FIGS. 1-5, persons skilled in the art will understand that the method in FIG. 6 may also be performed with other types of computing systems.

As shown, a method 600 begins at step 601, in which host 201 receives a request for data stored in data storage system 100 from one of clients 200 via network 140. For example, in some embodiments, data storage system 100 receives a GET command from one of clients 200, where the GET command includes a key (e.g., key K1) of a key-value pair stored in HDD 101 (e.g., key-value pair K1-V1). As shown in FIG. 2, key-value pair K1-V1 includes key K1 and value V1.

In step 602, host 201 transmits a read command to HDD 101 for data stored in the physical locations associated with key K1, i.e., value V1. Typically, the read command includes physical locations in HDD 101 that store key-value pair K1-V1. In some embodiments, prior to transmitting such a read command, data storage system 100 determines the physical locations to be included in the read command, based on key K1 and mapping table 170.

In step 603, host 201 receives from HDD 101 a read-error message associated with one or more physical locations (e.g., sectors) included in the read command issued in step 602. In general, HDD 101 transmits such an error message to host 201 after unsuccessfully executing the read command from host 201 and determining that at least a portion of the data stored in the physical location associated with key-value pair K1-V1 is unreadable. In some embodiments, HDD 101 determines that a particular physical location in HDD 101 includes unreadable data by performing a conventional error-recovery protocol targeting the particular physical location. For example, HDD 101 may perform one or more error checking and correcting (ECC) procedures, in which a read of requested data is performed multiple times and/or under non-standard conditions to attempt to recover the targeted data. Failure of such procedures to successfully recover the targeted data then results in HDD 101 transmitting the above-described read-error message to host 201 of data storage system 100.

In step 604, responsive to the read-error message received in step 603, host 201 determines the extent of unreadable region 501 in slab 220. For example, in some embodiments, host 201 or a controller of HDD 101 attempts to execute one or more read commands of some or all physical locations in slab 220 to determine what additional physical locations in slab 220 currently store unreadable data. Thus, host 201 or HDD 101 causes a read to be performed that targets one or more additional physical locations in slab 220 that are distinct from the physical locations included in the read command issued in step 602.

In some embodiments, determining the extent of unreadable region 501 includes reading contents, such as key-value pairs, of physical locations that are written to before contents are written to the one or more physical locations included in the read command issued in step 602. For example, when the read-error message received in step 602 includes the physical locations that include key-value pair K2-V2, in step 604 the contents of the physical locations that include key-value pair K1-V1 are read to determine the extent of unreadable region 501. Additionally or alternatively, in some embodiments, determining the extent of unreadable region 501 includes reading contents, such as key-value pairs, of physical locations that are written to after contents are written to the one or more physical locations included in the read command issued in step 602. For example, when the read-error message received in step 602 includes the physical locations that include key-value pair K2-V2, in step 604 the contents of the physical locations that include key-value pair K4-V4 are read to determine the extent of unreadable region 501. In yet other embodiments, the contents of most or all physical location of slab 220 are read in step 604 to determine the extent of unreadable region 501.

In step 605, responsive to the read-error message received in step 603, host 201 issues a read command to HDD 101. The read command targets one or more physical locations in slab 220 that store metadata indicating physical locations of key-value pairs that are stored within slab 220. Thus, in the embodiment illustrated in FIGS. 4 and 5, the read command issued in step 604 targets locations that store backup metadata 302, i.e., beginning portion 221 and ending portion 222. In this way, the physical locations of some or all other key-value pairs stored in slab 220 are quickly determined, i.e., without exhaustively searching mapping table 170. Specifically, HDD 101 seeks the read/write head used to execute the read command issued in step 602 to beginning portion 221 and/or ending portion 222, which is a relatively small distance, since said read/write head is already located proximate slab 220. Therefore, step 605 can be executed very quickly, for example on the order of a few milliseconds, and does not involve a lengthy search of the entirety of mapping table 170.

In step 606, host 201 receives the metadata requested in step 605 from HDD 101. It is noted that beginning portion 221, which stores metadata associated with key-value pairs stored in second bulk storage portion 432, is separated from second bulk storage portion 432 by first bulk storage portion 431. Consequently, unreadable region 501 must span more than half of slab 220 to include portions of both beginning portion 221 and second bulk storage portion 432. Similarly, ending portion 222, which stores metadata associated with key-value pairs stored in first bulk storage portion 431, is separated from first bulk storage portion 431 by second bulk storage portion 432. Consequently, unreadable region 501 must span more than half of slab 220 to include portions of both ending portion 222 and first bulk storage portion 431. Thus, even though slab 220 includes unreadable region 501, there is very low probability that backup metadata 302 associated with key-values included in unreadable region 501 are unreadable.

In step 607, host 201 determines what keys stored in slab 220 are associated with key-value pairs stored in unreadable region 501. Host 201 makes such a determination based on the backup metadata 302 read in step 606. In step 608, host 201 transmits to client 201 the keys determined in step 607 to be associated with key-value pairs associated with unreadable data.

Figure 7:
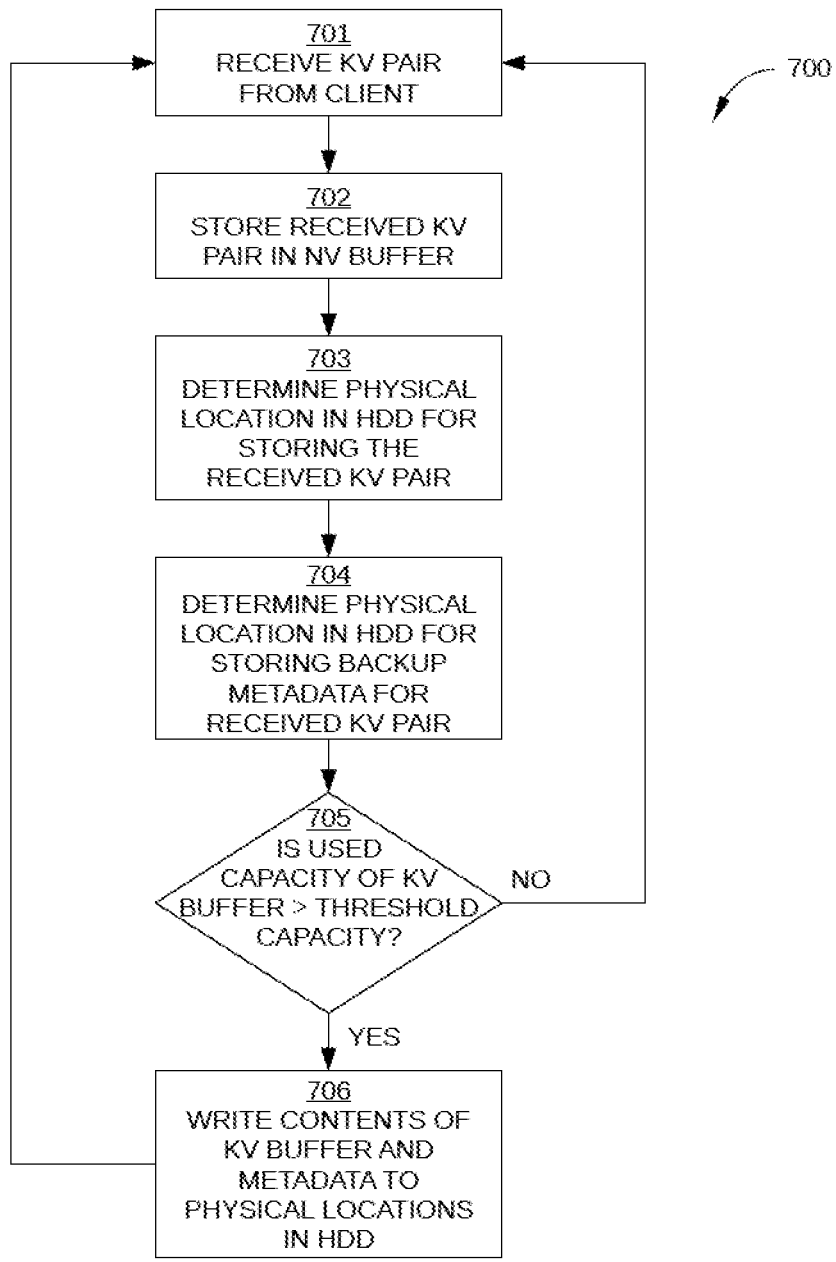
FIG. 7 sets forth a flowchart of method steps carried out by a data storage system when storing data, according to one or more embodiments.

FIG. 7 sets forth a flowchart of method steps carried out by data storage system 100 when storing data, according to one or more embodiments. Although the method steps are described in conjunction with data storage system 100 of FIGS. 1-5, persons skilled in the art will understand that the method in FIG. 7 may also be performed with other types of computing systems.

As shown, a method 700 begins at step 701, in which host 201 receives object data, such as a key-value pair, from one of clients 200 via network 140. For example, host 201 may receive a PUT command that includes key-value pair K1-V1 from one of clients 200.

In step 702, host 201 stores the key-value pair received in step 701, e.g., key-value pair K1-V1, in nonvolatile buffer 123. Because the data associated with key-value pair K1-V1 will not be lost in the event of unexpected loss of power to data storage system 100, these data are effectively stored in a nonvolatile medium in step 702.

In step 703, host 201 determines a physical location in HDD 101 or HDD 102 for storing the key-value pair received in step 701. Host 201 then maps the key of the key-value pair received in step 701 (e.g., key K1) to this physical location in HDD 101 or HDD 102 (e.g., location 1), by recording a suitable entry in mapping table 170. The physical location mapped to the key of the received key-value pair includes sectors in the next available slab 220 of HDD 101 or HDD 102. Thus, when the contents of nonvolatile buffer 123 are flushed to HDD 101 or HDD 102, the various key-value pairs stored in nonvolatile buffer 123 are all stored in a single slab 220.

As described above, in some embodiments, the sectors selected in the next available slab 220 for storing a newly received key-value pair may not correspond sequentially to the order in which key-value pairs are received. That is, the sector or sectors for storing the first key-value pair received by host 201 may not be the first (lowest numbered) sector or sectors of slab 220. Instead, the sector or sectors selected for storing the first key-value pair received by host 201 may be located at the end of slab 220, at the beginning or end of second bulk storage portion 432, at the beginning or end of first bulk storage portion 431, or at any other suitable location within slab 220 that facilitates the storage of backup metadata 302 in a physical location in slab 220 that is separated from the key-value pairs associated with backup metadata 302. Similarly, in such embodiments, the sector or sectors selected for storing the next key-value pair received by host 201 do not consecutively follow the sector or sectors selected for storing the first key-value pair. Instead, the sector or sectors selected for storing the next key-value pair received by host 201 may be located at any suitable location within slab 220 that facilitates the storage of backup metadata 302 in a physical location in slab 220 that is separated from the key-value pairs associated with backup metadata 302.

In step 704, host 201 determines a physical location in slab 220 for storing backup metadata 302 associated with the key-value pair received in step 601. For example, in the embodiment illustrated in FIGS. 4 and 5, when key-value pair K1-V1 is received by host 201 in step 701 and physical locations in a particular slab 220 are selected in step 703 for storing key-value pair K1-V1, host 201 determines a physical location in the particular slab 220 for storing pointer 1 and key 1.

In step 705, host 201 determines whether the used capacity of nonvolatile buffer 123 exceeds a threshold capacity of nonvolatile buffer 123. If yes, method 700 proceeds to step 705; if no, method 700 proceeds back to step 701.

In step 706, host 201 causes contents of nonvolatile buffer 123 to be written to the physical locations determined in steps 703 and 704. Specifically, the key-value pairs stored in nonvolatile buffer 123 are written to the physical locations in a selected slab 220, where the physical locations are those determined in step 703. In addition, the backup metadata 302 associated with the key-value pairs stored in nonvolatile buffer 123 are stored in physical locations in the same slab 220, where the physical locations are those determined in step 704. In some embodiments, the contents of nonvolatile buffer 123 written to slab 220 in step 706 is executed as a single sequential write process, thereby reducing latency associated with performing a plurality of write operation at different locations in HDD 101 or HDD 102. Method 700 then proceeds back to step 701.

In sum, embodiments described herein provide systems and methods suitable for use in a cloud data storage system to store object data in an HDD in conjunction with backup metadata associated with the object data. In some embodiments, a key-value pair and backup metadata associated therewith are written in different locations in the HDD, but as part of a single sequential write operation. In the event that one or more key-value pairs are determined to be unreadable, the backup metadata can be read to efficiently determine which other key-value pairs stored in the HDD are unreadable.

While the foregoing is directed to embodiments of the present invention, other and further embodiments of the invention may be devised without departing from the basic scope thereof, and the scope thereof is determined by the claims that follow.

We claim:

1. A method of storing contents of a key-value buffer into one of multiple regions of a disk drive in a system having multiple disks, wherein the multiple regions are contained in a first shingled magnetic recording (SMR) band of a plurality of SMR bands of the disk drive, the method comprising:
   determining that a used capacity of the key-value buffer is greater than a threshold capacity, wherein the threshold capacity is less than a capacity of the first SMR band; and
   upon determining that the used capacity of the key-value buffer exceeds the threshold capacity:
      writing first and second key-value pairs in the key-value buffer to first and second physical locations in a first region, which is one of the regions that are contained in the first SMR band, respectively; and
      writing metadata that indicates the first and second physical locations as the storage location for the first and second key-value pairs, respectively, in third and fourth physical locations in the first region,
   wherein the writing of the first and second key-value pairs to the first and second physical locations and the writing of the metadata to the third and fourth physical locations are carried out by a single sequential write process, and the first and second physical locations are between the third and fourth physical locations in the first region, and
   wherein the multiple regions are sequentially arranged within the first SMR band and each of the multiple regions has a capacity equal to the threshold capacity.

2. The method of claim 1, wherein contents of the first and third physical locations are not written consecutively in the single sequential write process.

3. The method of claim 1, wherein contents of the first and second physical locations are written consecutively in the single sequential write process.

4. The method of claim 1, further comprising:
   receiving the first and second key-value pairs; and
   storing the received first and second key-value pairs in the key-value buffer.

5. The method of claim 1, further comprising:
   receiving a third key-value pair for storage in the at least one disk drive;
   storing the third key-value pair in the key-value buffer; and
   determining a fifth physical location in the first region for storing the third key-value pair and a sixth physical location in the first region for storing metadata associated with the third key-value pair.

6. The method of claim 5, wherein the metadata indicates the fifth physical location as the storage location in the first region for the third key-value pair,
   wherein the third key-value pair is an even-numbered key-value pair, the first key-value pair is an even-numbered key-value pair, and the second key-value pair is an odd-numbered key-value pair, and
   wherein the metadata associated with the third key-value pair is stored adjacent to the metadata associated with the first key-value pair in a beginning portion of the first region, and wherein the metadata associated with the second key-value pair is stored apart from the metadata associated with the third key-value pair and the metadata associated with the first key-value pair in an ending portion of the first region.

7. The method of claim 6, further comprising:
   writing the third key-value pair in the key-value buffer to the fifth physical location; and
   writing the metadata associated with the third key-value pair in the sixth physical location.

8. The method of claim 7, wherein the single sequential write process includes writing the third key-value pair to the fifth physical location and writing the metadata associated with the third key-value pair in the sixth physical location.

9. The method of claim 5, wherein, in the single sequential write process, contents of the fifth physical location are not written consecutively with contents of the first physical location or the second physical location.

10. The method of claim 9, wherein, in the single sequential write process, contents of the first and second physical locations are written consecutively.

11. The method of claim 9, wherein the third key-value pair is the key-value pair received directly after the first key-value pair.

12. The method of claim 1, wherein, in the single sequential write process, the metadata are written in the third and fourth physical locations before the first and second key-value pairs are respectively written to the first and second physical locations.

13. The method of claim 1, wherein, in the single sequential write process, the metadata are written in the third and fourth physical locations after the first and second key-value pairs are respectively written to the first and second physical locations.

14. The method of claim 1, wherein
   the multiple regions including the first region are slabs included in the first SMR band.

15. The method of claim 14, wherein
   the plurality of SMR bands are separated by one or more guard spaces in the disk drive.

16. A method of retrieving data from a data storage system that repeatedly moves contents of a key-value buffer into one of multiple regions of disk drive of the system having multiple disks depending on a used capacity of the key-value buffer, wherein the multiple regions are contained in a first shingled magnetic recording (SMR) band of a plurality of SMR bands of the disk drive, the method comprising:
   receiving, from a disk drive of the data storage system, a read-error message in response to a read that targets each of first and second physical locations in a first region, which is one of the regions that are contained in the first SMR band;
   responsive to the read-error message, issuing a read that targets each of third and fourth physical locations in the first region, the third and fourth physical locations storing first and second metadata including first and second pointers to physical locations of first and second key-value pairs that are stored within the first and second physical locations, respectively; and determining, based on the metadata, first and second keys associated with the first and second physical locations, wherein writing of the first and second key-value pairs to the first and second physical locations and writing of the metadata to the third and fourth physical locations are carried out by a single sequential write process in response to the used capacity of the key-value buffer exceeding a threshold capacity, which is less than a capacity of the first SMR band, and the first and second physical locations are between the third and fourth physical locations in the first region, and wherein the multiple regions are sequentially arranged within the first SMR band and each of the multiple regions has a capacity equal to the threshold capacity.

17. The method of claim 16, wherein the contents of the first and third physical locations are not written consecutively in the single sequential write process.

18. The method of claim 17, wherein the second physical location is distinct from the first physical location and stores one or more additional key-value pairs.

19. The method of claim 18, wherein, in a single sequential write process, contents of the second physical location are written before contents are written to the first physical location.

20. The method of claim 18, wherein, in a single sequential write process, contents of the second physical location are written after contents are written to the first physical location.

21. The method of claim 18, wherein contents of the second physical location comprise the next key-value pair written in the single sequential write process directly after contents are written to the first physical location in the single sequential write process.

* * * * *